United States Patent [19]

Neuerburg

[11] Patent Number: 4,896,493
[45] Date of Patent: Jan. 30, 1990

[54] PIVOTAL MOWING GROUP FOR A TRACTOR

[75] Inventor: Horst Neuerburg, Saverne, France

[73] Assignee: Kuhn S.A., Saverne, France

[21] Appl. No.: 323,831

[22] Filed: Mar. 15, 1989

[30] Foreign Application Priority Data

Mar. 15, 1988 [FR] France .................. 88 03491

[51] Int. Cl.$^4$ .................................. A01D 55/18
[52] U.S. Cl. .................................. 56/255; 56/6
[58] Field of Search .......... 56/6, 7, 255–257, 56/228, 294, 295

[56] References Cited

U.S. PATENT DOCUMENTS

| | | | |
|---|---|---|---|
| 2,494,662 | 1/1950 | Lind | 56/255 |
| 3,115,738 | 12/1963 | Engler | 56/6 |
| 3,583,133 | 6/1971 | Kasberger | 56/6 |
| 3,907,039 | 9/1975 | Remley et al. | 56/256 X |
| 4,110,959 | 9/1978 | Oosterling et al. | 56/6 X |
| 4,829,754 | 5/1989 | Shimamura et al. | 56/6 X |

FOREIGN PATENT DOCUMENTS

| | | |
|---|---|---|
| 0070585 | 1/1983 | European Pat. Off. . |
| 0184155 | 11/1985 | European Pat. Off. . |
| 0165039 | 12/1985 | European Pat. Off. . |
| 1900165 | 7/1969 | Fed. Rep. of Germany . |
| 2255839 | 7/1975 | France . |

Primary Examiner—Thuy M. Bui
Attorney, Agent, or Firm—Oblon, Spivak, McClelland, Maier & Neustadt

[57] ABSTRACT

A mower has a frame which allows the mower to be hitched to a tractor. A mowing group is connected to the frame by a joint having an axis directed substantially in a direction of advance. The mowing group is equipped with at least one cutting element and one rotor, with the rotor extending in part at least above one of the cutting elements. The mower also includes drive elements for the cutting elements and the rotor, and a control element which allows the mowing group to be pivoted around the joint connecting the mowing group to the frame to bring the mowing group to a transport position in which the mowing group is directed upward.

29 Claims, 5 Drawing Sheets

PIVOTAL MOWING GROUP FOR A TRACTOR

BACKGROUND OF THE INVENTION

1. Field of the Invention:

This invention relates to a mower comprising a frame which allows the mower to be hitched to a tractor and a mowing group connected to the frame by a joint with an axis directed substantially in the direction of advance. The mowing group is equipped with at least one cutting element and at least one rotor arranged close to the end of the mowing group where the latter is connected to said frame. The rotor extends in part at least above one part of the cutting element or elements and turns around an axis directed upward. The mower also comprises drive elements of the cutting element or elements and of the rotor comprising in particular a drive shaft made up by at least one part, penetrating in the rotor and turning substantially around the rotation axis of the rotor, and a bevel gear pair arranged at the upper end of the drive shaft. The mower further comprising a control element which allows for pivoting around the joint with an axis directed substantially in the direction of advance to bring the mowing group to a transport position in which the mowing group is directed upward.

2. Description of the Related Art:

FR-A-2 255 839 describes such a mower whose mowing group comprises a cutting bar equipped with six disks turning around axes directed upward. The disks extending at each end of the cutting bar are surmounted by a rotor. This known mower further comprises a frame which allows it to be hitched to a tractor. The mowing group is connected to this frame by means of a joint with an axis directed substantially in the direction of advance. For this purpose, the frame is equipped with a yoke to which is connected in an articulated manner a support element forming part of the mowing group. This support element comprises a foot extending substantially horizontally at the rear end of which is fastened a leg extending approximately vertically. The foot is fastened by its front end to the cutting bar and the leg is connected at its upper end to the frame by the joint with an axis directed substantially in the direction of advance. This support element extends in top view entirely behind the first disk. The disks and rotors of this known mower are driven in rotation by a drive shaft going through the rotor surmounting the first disk. This drive shaft comprises two parts connected to each other by an elastic coupling. At its lower part, the drive shaft is connected in rotation on one hand to the first disk and the rotor surmounting the latter, and on the other hand to a cylindrical gear housed in a cutting bar housing. This cylindrical gear transmits the movement to a cascade of other cylindrical gears also housed in the cutting bar housing and assuring the driving in rotation of the other disks and the other rotor. The drive shaft is itself driven in rotation by a shaft whose rotation axis is merged with the axis of the joint connecting the mowing group to the frame and by a bevel gear pair extending at the upper end of the drive shaft and connecting it in rotation to the shaft. This shaft is driven in rotation by the power takeoff of the tractor by a cardan shaft and a belt pulley device. This known mower also comprises a hydraulic cylinder fastened between the frame and the mowing group to bring the mowing group by pivoting around the joint to a transport position in which the mowing group extends upward.

This known mower exhibits the feature of having a mowing group whose overall width at ground level is equal to the width of the cutting. This is advantageous in several respects. Actually, during the first pass the mowing group does not bend the product to be harvested without cutting it. Further, during subsequent passes, it is not necessary to clear strips of ground wider than those necessary for the wheels of the tractor extending opposite the cutting bar. As there is no part of the mowing group which at ground level projects beyond the width of the cutting, the risks of packing due to hooking of the cut product to such a part is eliminated.

In transport, this known mower exhibits, however, the drawback of widely exceeding the overall width of the tractor. This is due in particular to the fact that the axis of the joint connecting the mowing group to the frame extends above the rotor surmounting the first disk, i.e. at a height relatively significant in relation to the ground. Thus, when the mowing group is pivoted into its transport position in which it extends substantially vertically, the mowing group extends laterally beyond the joint a distance equal to the value of said height. This therefore substantially increases the overall width of the tractor-mower unit and can pose problems for passing on narrow roads or through some farm entrance gates. This also causes visibility problems when driving. As the center of gravity of the mowing group is offset relatively laterally, the frame of the mower and the hitching device of the tractor are substantially stressed. In addition, the wheels of the tractor extending on the side opposite that where the mowing group extends, are eased substantially, which can pose stability problems for low-power tractors. The object of this invention is to solve this problem.

SUMMARY OF THE INVENTION

Accordingly, one object of this invention is to provide for a mower in which the axis of the joint connecting the mowing group to the frame extends lower than the center of the bevel gear pair arranged at the upper end of the drive shaft penetrating the rotor.

According to the above object a mower to be moved by a tractor during work in a direction of work comprises a frame for hitching the mower to the tractor during the work, and a mowing group having a first end connected to the frame by a joint. The joint has an axis which is directed substantially in the work direction. The mowing group is positionable during the work in a work position in which it extends substantially close to the ground. The mowing group also includes, at least one cutting element, and at least one rotor arranged close to the first end of the mowing group. At least, part of the rotor extends above a part of said at least one cutting element and rotates around its vertical rotational axis. The mowing group also includes drive elements of the at least one cutting element and the rotor which received the movement of a driving source. The drive elements comprise, a drive shaft having a lower end extending into the rotor and having the same rotational axis as said rotor, and a first bevel gear pair arranged at an upper end of the drive shaft and being in meshing engagement. The first bevel gear pair defining a point where the rotational axes of the bevel gears of the first bevel gear pair intersect. The mower further comprises a control element for bringing the mowing group from the work position to a transport position in which the mowing group is disposed in an upward direction, by pivoting the mowing group around the joint having an axis substantially directed in the direction of work. The axis of the joint connecting the mowing group to the frame is disposed in a vertically lower position than the point of intersection of the axes of the bevel gears of the first bevel gear pair.

With this arrangement, the height to which extends the axis of the joint connecting the mowing group to the frame is lower. Consequently, when the mowing group is pivoted into its transport position, it extends laterally a smaller distance beyond the axis of the joint, while its part which is extended at work higher than the axis of the joint, is passed to the other side of said axis toward the tractor. Thereby, the overall width of the tractor-mower unit is smaller. Further, the center of gravity of the mowing group extends closer to the median axis of the tractor, which puts less stress on the frame of the mower and the hitching device of the tractor and lightens less the load on the wheels of the tractor extending on the side opposite that where the mowing group extends.

Preferably, the axis of the joint connecting the mowing group to the frame is offset toward the tractor. This allows for the bringing of the mowing group closer to the tractor during its pivoting in the transport position.

Advantageously, provisions are made in the invention for the axis of the joint connecting the mowing group to the frame to extend approximately to the mid-distance between the cutting element, above which extends at least partially the rotor, and the center of the bevel gear pair arranged at the upper end of the drive shaft penetrating the rotor. This feature is particularly advantageous when the axis of the joint is offset toward the tractor. In this case, the joint can extend beyond the width of the cutting. Now, with this feature, the joint can be prevented from coming into contact with the windrow of cut product formed in the preceding pass, while conserving during transport, an overall width reasonable for the tractor-mower unit.

The end of the mowing group where it is connected to the frame is equipped with a support element by which the mowing group is connected to the frame. In the invention, this support element comprises a bearing defining the joint, a leg extending from this bearing downward and connected at its foot to a lower carrying element of the mowing group, and an arm extending from the bearing upward and connected at its upper part to a transmission housing in which the bevel gear pair arranged at the upper end of the drive shaft extends.

Advantageously, at least the foot of the leg of the support element extends approximately inside the width of the cutting.

According to a further object of the invention, provisions are made for the drive elements to comprise in addition a shaft guided in rotation in the bearing of the support element and turning around the axis of the joint, another bevel gear pair connected in rotation to said shaft, and an intermediate shaft connected in rotation to this other bevel gear pair and to the bevel gear pair arranged at the upper end of the drive shaft.

Advantageously, this intermediate shaft extends inside the arm of the support element.

According to a further object of the invention, provisions are made for the mowing group to comprise a cutting bar equipped with said cutting element or a part at least of said cutting elements, the cutting bar being carried by a carrying structure formed at least by the support element and by the lower carrying element of the mowing group.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
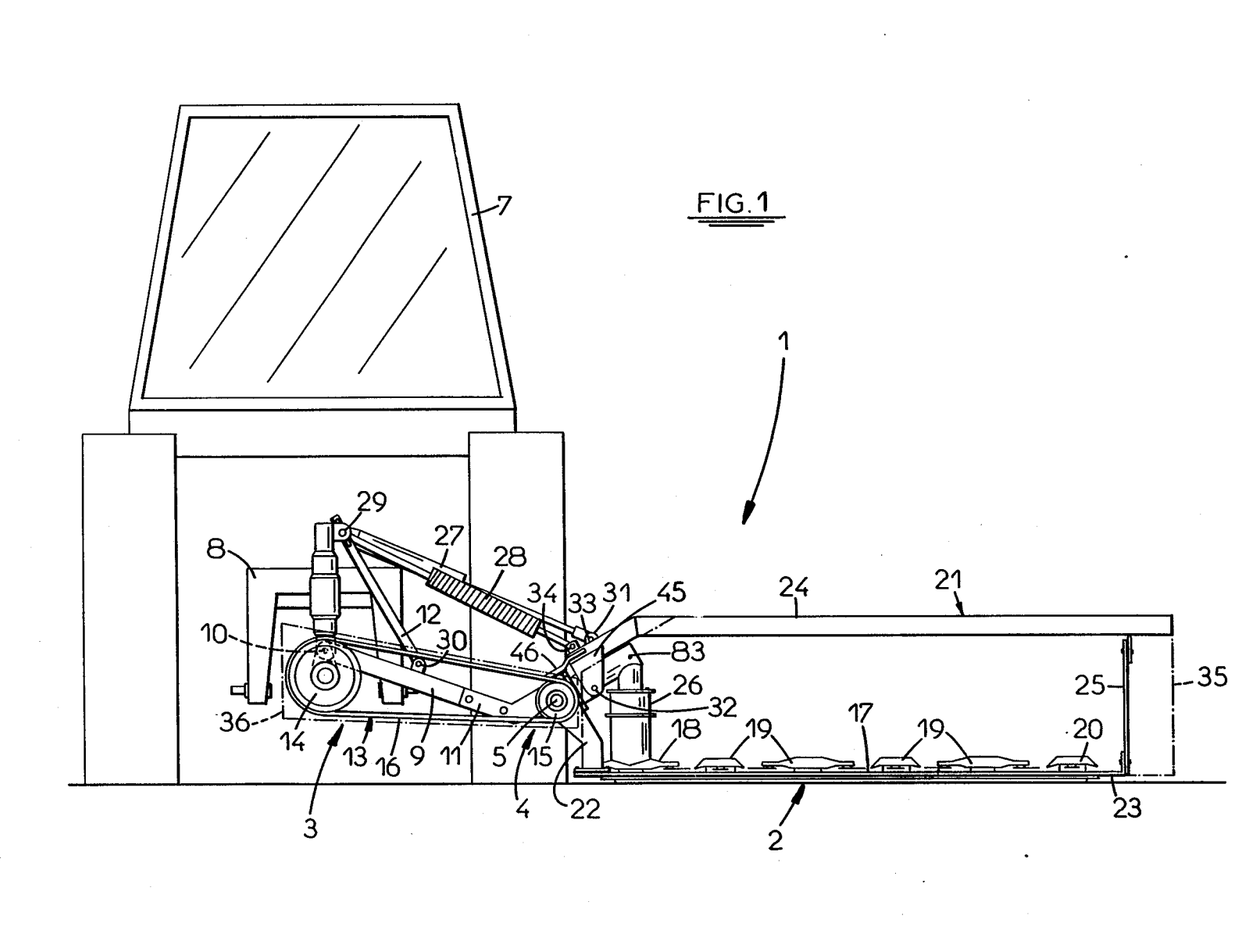
FIG. 1 shows, in the work position, a mower according to the invention in a rear view in the direction of advance and hitched to a tractor.

Mower (1) according to the invention, such as is shown in FIG. 1, comprises a mowing group (2) and a frame (3). Mowing group (2) is connected to frame (3) by a joint (4) with axis (5) substantially directed in the direction of advance (6) defined in FIGS. 2 and 3.

At work, mower (1) is hitched to the hitching device of a tractor (7) so that mowing group (2) extends, with mower (1) seen in direction of advance (6), laterally beside the path of tractor (7) and crosswise to the direction of advance (6). For this purpose, frame (3) is equipped with a hitching device (8) intended to be coupled to the hitching device of tractor (7). Frame (3) comprises further a support arm (9) connected at one of its ends to hitching device (8) by means of a joint (10) with an axis substantially directed in the direction of advance (6). Support arm (9) extends crosswise to the direction of advance (6) and is connected at its other end to mowing group (2) by means of joint (4). For this purpose, support arm (9) is equipped at this other end with a yoke (11).

Between hitching device (8) and support arm (9) also extends a travel-limiting element (12) limiting the possible travel of support arm (9) in relation to hitching device (8). This travel-limiting element (12) limits in particular the downward pivoting of support arm (9) around joint (10). In the example shown, this travel-limiting device (12) is made in the form of a tie rod equipped with an oblong hole.

Frame (3) also supports a part of transmission elements (13) transmitting the movement from the power takeoff (not shown) of tractor (7) to the drive elements (which will be described below) of mowing group (2). In the example shown, these transmission elements (13) consist of a cardan transmission shaft (not shown) which is connected in rotation to a first pulley (14) fastened to support arm (9) and having a rotation axis substantially directed in the direction of advance (6), a second pulley (15) whose rotation axis is merged with axis (5) of joint (4), and an endless transmission element (16) winding on the two pulleys (14, 15).

Mowing group (2) comprises a cutting bar (17) equipped with cutting elements (18, 19, 20). In the example shown, cutting elements (18, 19, 20) consist of disks equipped at their periphery with cutting tools and turning around axes directed upward. Mowing group (2) further comprises a carrying structure (21) which supports cutting bar (17). This carrying structure (21) comprises a support element (22), a lower carrying element (23), an upper carrying element (24) and a connecting element (25). Lower carrying element (23) and upper carrying element (24) are connected to each other on one side by support element (22) extending at the end of mowing group (2) close to tractor (7), and on the other side by connecting element (25) provided at the other end of mowing group (2). Support element (22) extends between two wings (111, 112) (FIG. 2) of yoke (11) of support arm (9) and forms with this yoke (11) joint (4) connecting mowing group (2) to the end of support arm (9) at a distance from hitching device (8).

As can be seen in FIG. 1, this joint (4) is offset toward tractor (7) and extends beside cutting element (18) closest to support element (22) and a rotor (26). In addition, it is seen in FIG. 1 that axis (5) of joint (4) extends, with mower (1) seen in direction of advance (6), approximately on the level of the outside part of the rear wheel of tractor (7) extending on the same side of tractor (7) as mowing group (2).

Support element (22) contains in addition a part of the drive elements intended in particular for driving cutting elements (18, 19, 20). These drive elements will be described below in more detail. In FIG. 1, it is seen simply that a part of the latter extends through cutting element (18) extending closest to tractor (7). Actually in part for this purpose this cutting element (18) is surmounted by a rotor (26) which turns also around an axis directed upward. In the example shown, rotor (26) turns at the same speed and around the same axis as cutting element (18) that it surmounts.

Mower (1) of this invention is thus what is called a direct-drive mower. In such a mower, the cutting width of mowing group (2) is approximately equal to the overall width of said mowing group (2) measured at ground level.

Connecting element (25) also performs, in the example shown, a separation function between the product cut by cutting element (20) which extends closest to it and the product still standing.

Between hitching device (8) and mowing group (2) are provided a control element (27) and a lightening element (28) of mowing group (2). In the example shown, control element (27) is a hydraulic cylinder and lightening element (28), a draw spring. In the example shown, it is seen also that control element (27) and lightening element (28) are connected to hitching device (8) with the assistance of the same pin (29) as that which connects travel-limiting element (12) to said hitching device (8). This travel-limiting element (12) is connected further to support arm (9) by a pin (30). Control element (27) is connected to mowing group (2) by a lever (31) which is connected to mowing group (2) by a pin (32) and to control element (27) by a pin (33). Lightening element (28) is connected to mowing group (2) by a pin (34). Pins (29, 30, 32, 33 and 34) are substantially directed in the direction of advance (6).

In FIG. 1, it can also be seen that mowing group (2) comprises a protective device (35) (shown by dotted lines) which surrounds cutting elements (18, 19, 20). Frame (3) is equipped with a protective hood (36) (also shown by dotted lines) which partially surrounds pulleys (14, 15) and endless transmission element (16).

Figure 2:
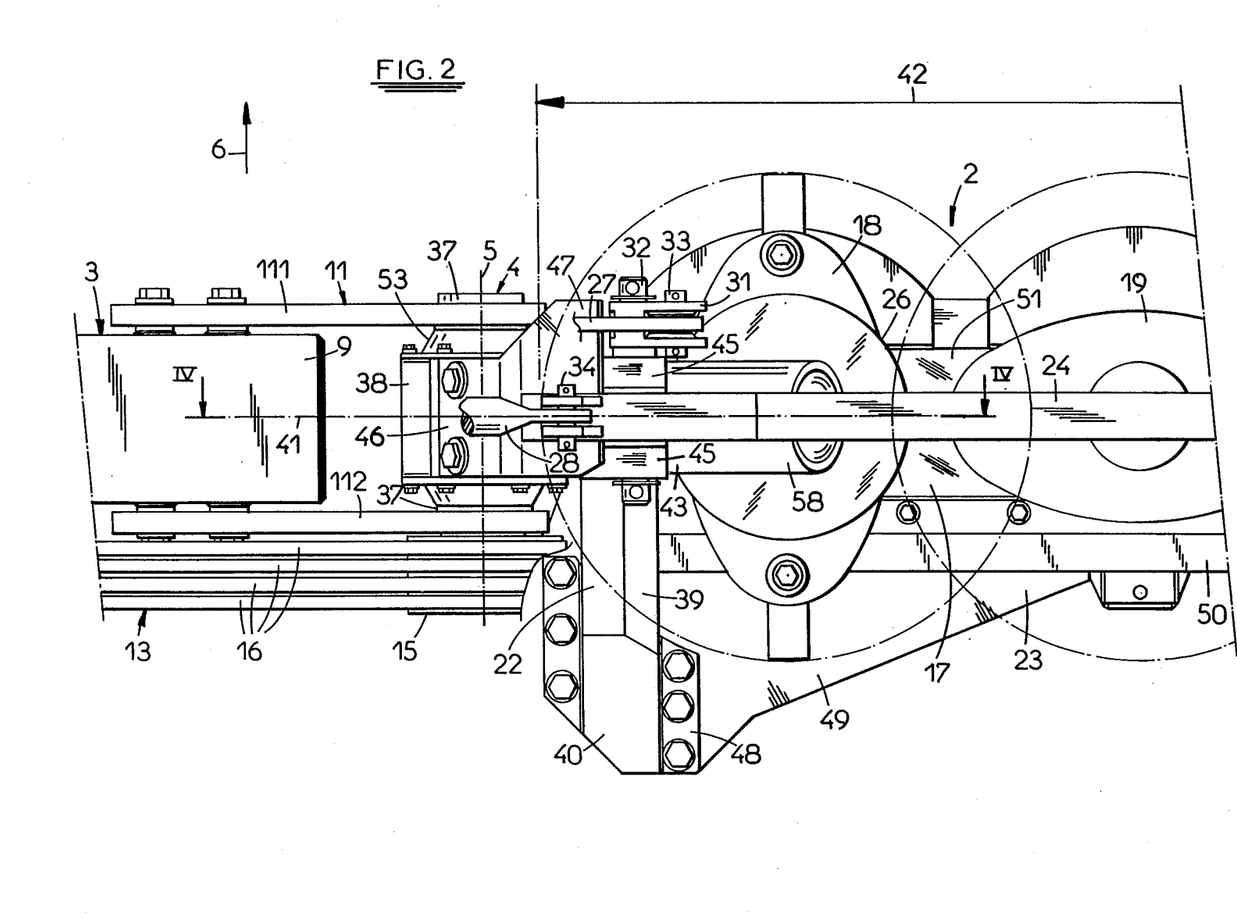
FIG. 2 shows on an enlarged scale a top view of the connection of the mowing group to the frame.
Figure 3:
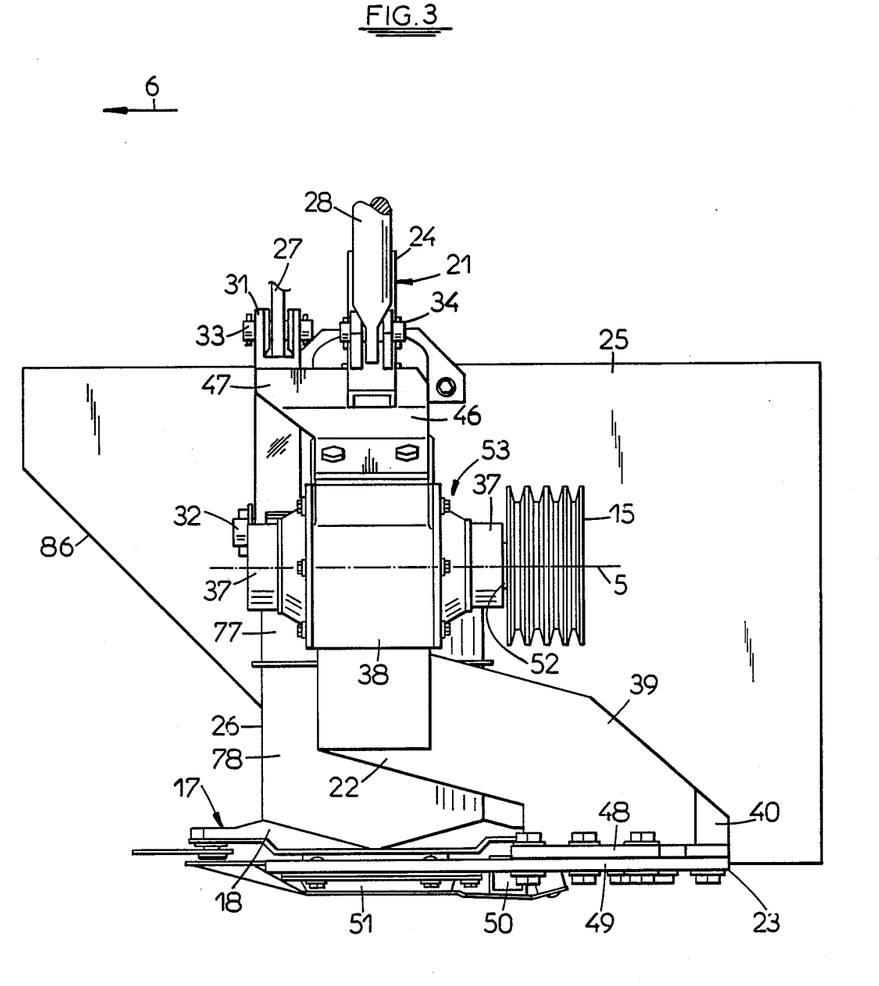
FIG. 3 shows on an enlarged scale a side view of the single mowing group.
Figure 4:
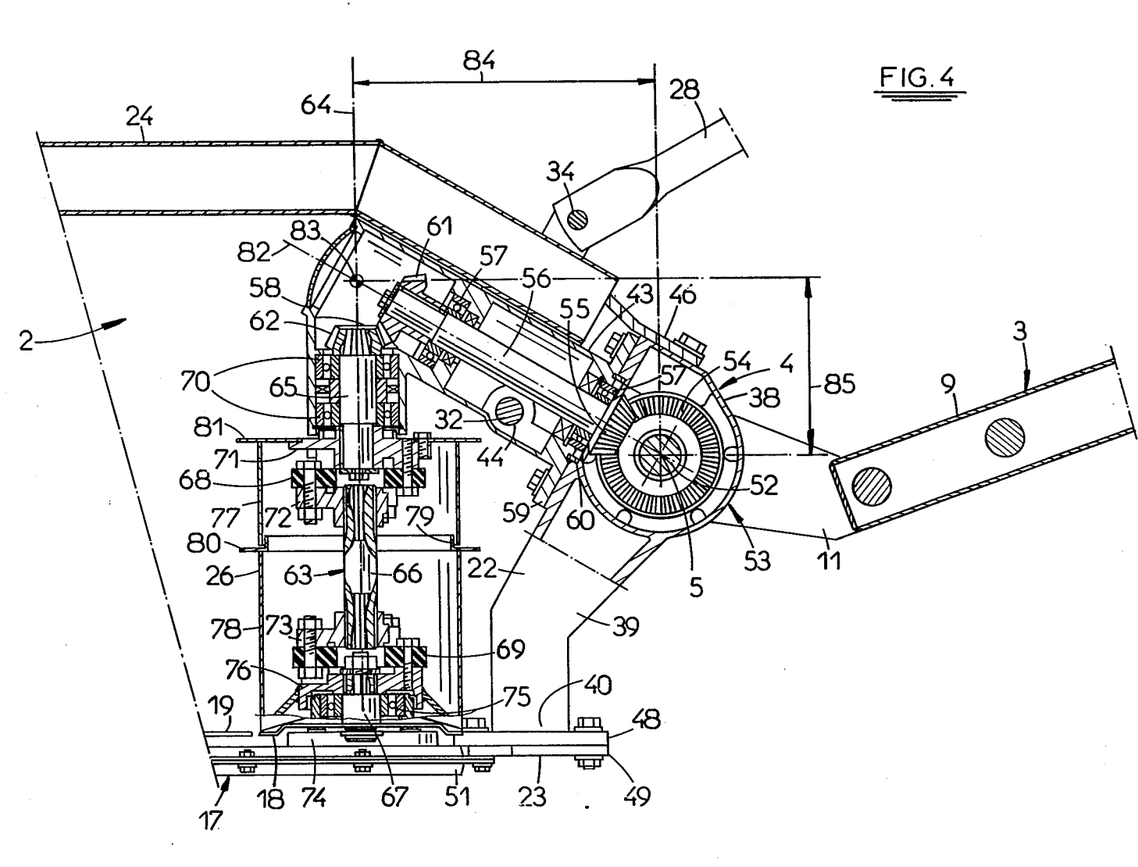
FIG. 4 shows on an enlarged scale a view in section according to plane IV—IV defined in FIG. 2.

In FIGS. 2 to 4, the connection of mowing group (2) to frame (3) has been shown in more detail as well as the way in which cutting elements (18, 19, 20) of cutting bar (17) of mowing group (2) are driven.

As stated above, support element (22), with yoke (11) of support arm (9), forms joint (4). For this purpose, support element (22) comprises two cylindrical bearing surfaces (37) capable of turning in wings (111, 112) of yoke (11). These cylindrical bearing surfaces (37) are made in the form of flanges which are mounted on a casing (38) which is also part of support element (22). Support element (22) also comprises a leg (39) which extends from casing (38) downward in the direction of lower carrying element (23). This leg (39) comprises a foot (40) by which support element (22) is connected to lower carrying element (23). In FIGS. 2 and 3, it is seen that casing (38) extends approximately symmetrically in relation to a longitudinal plane (41) (FIG. 2) of mowing group (2) while foot (40) of leg (39) extends behind this plane (41). Thereby, leg (39) extends from casing (38) toward the rear and downward. In FIGS. 2 and 4, it is seen in addition that casing (38) extends in top view essentially outside a cutting zone (42) of cutting elements (18, 19, 20) whereas foot (40) of leg (39) extends inside this cutting zone (42). To do this, leg (39) also extends in part from casing (38) toward a median part of mowing group (2). In the example shown, it is seen in addition that foot (40) extends behind cutting element (18) located beside support element (22) and that a large part of leg (39) extends above said cutting element (18) and beside rotor (26) surmounting this cutting element (18). Support element (22) also comprises an arm (43) which extends from casing (38) upward and toward the median part of mowing group (2). This arm (43) comprises a bore (44) in which pin (32) is introduced by which lever (31) is connected to mowing group (2).

But this pin (32) also serves to connect upper carrying element (24) to support elements (22). This upper carrying element (24) consists of a pipe extending approximately in the longitudinal plane (41) of mowing group (2) and over a large part of its length parallel to cutting bar (17) and a certain distance above the latter. At its end close to support element (22), on the other hand, it extends approximately parallel to arm (43). At this end, upper carrying element (24) comprises two wings (45) forming a yoke inside of which arm (43) extends and which is connected to this arm (43) by means of pin (32). At this end, upper carrying element (24) is equipped also with a connecting plate (46) by which it is screwed to casing (38) of support element (22). Upper carrying element (24) is thus connected in a removable manner to support element (22).

Figure 5:
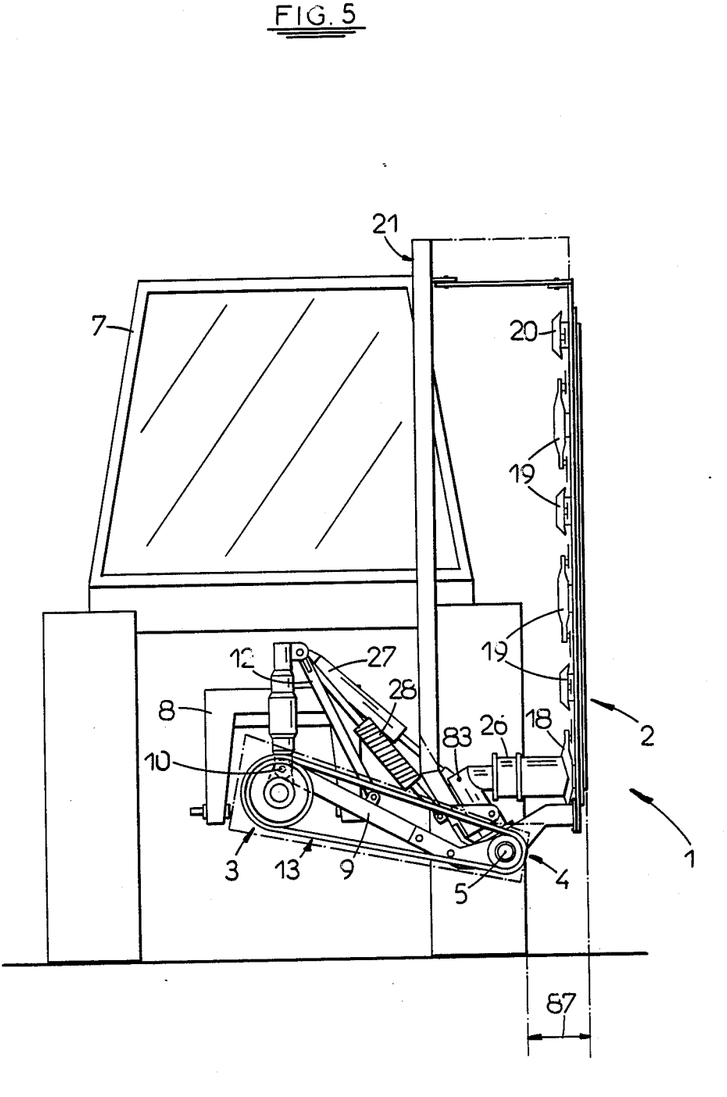
FIG. 5 shows the mower pivoted in a transport position.

In FIGS. 2 and 3 it is seen that connecting plate (46) is asymmetrical and comprises a stop (47) extending in the pivoting zone of lever (31). In the work position, lever (31) is at a distance from stop (47), which allows mowing group (2) to adapt to the ground surface by pivoting a certain value around joint (4). When control element (27) is operated to make mowing group (2) pivot upward to bring it into a transport position (FIG. 5), the pivoting of mowing group (2) will begin only when lever (31) comes in contact with stop (47).

As stated above, support element (22) is connected by foot (40) of leg (39) to lower carrying element (23). For this purpose, foot (40) of leg (39) of support element (22) comprises a flange (48) by which support element (22) is screwed to carrying plate (49) of lower carrying element (23). This carrying plate (49) is fastened to a stiffener (50) which extends behind cutting bar (17) which comprises a housing (51) above which cutting elements (18, 19, 20) extend. Stiffener (50) consists of a pipe extending parallel to said housing (51). At their other end, lower carrying element (23) and upper carrying element (24) are connected in a removable manner to connecting element (25). Carrying structure (21) thus formed carries cutting bar (17) whose housing (51) is screwed to lower carrying element (23) which extends below the cutting plane of cutting elements (18, 19, 20).

FIGS. 2-4 show the drive elements of cutting elements (18, 19, 20) and rotor (26) which receive the movement of transmission elements (13).

These drive elements comprise a shaft (52) guided in rotation in cylindrical bearing surfaces (37) of casing (38) of support element (22). The rotation axis of this shaft (52) is merged thus with axis (5) of joint (4). Guiding in rotation of this shaft (52) in bearing (53) formed by cylindrical bearing surfaces (37) and casing (38), is within the scope of one skilled in the art. Pulley (15) is connected in rotation to the back end of shaft (52) which for this purpose comes out of bearing (53).

Inside of bearing (53), shaft (52) is connected in rotation to a bevel gear (54) which engages with a bevel gear (55). The latter bevel gear (55) is connected in rotation to an end of an intermediate shaft (56) which is guided in rotation in arm (43) by means of roller bearings (57). At its other end, intermediate shaft (56) penetrates a transmission housing (58) extending above cutting element (18) and rotor (26).

In the example shown, this transmission housing (58) and arm (43) are formed by a single part. At its end opposite casing (38), arm (43) comprises a flange (59) which allows for the screwing of the transmission housing (58)-arm (43) unit on casing (38). So that bevel gear (55) which is guided in rotation in arm (43), is correctly positioned in relation to bevel gear (54) guided in rotation in casing (38), a centering ring (60) centers arm (43) in relation to casing (38).

Inside of transmission housing (58), intermediate shaft (56) is connected in rotation to a bevel gear (61) which engages with a bevel gear (62). The latter bevel gear (62) is connected in rotation to a drive shaft (63) whose rotation axis (64) is merged with the rotation axis of cutting element (18) and rotor (26) surmounting this cutting element (18). Drive shaft (63), in the example shown, comprises three parts: an upper part (65), an intermediate part (66) and a lower part (67). These three parts (65, 66, 67) of drive shaft (63) are connected to each other by two elastic couplings (68, 69). Upper part (65) of drive shaft (63), at the upper end of which is connected in rotation bevel gear (62), is guided in rotation in transmission housing (58) by means of two roller bearings (70). At its lower end, upper part (65) of drive shaft (63) is connected in rotation to a drive flange (71) which is itself fastened to elastic coupling (68). Intermediate part (66) of drive shaft (63) is connected in rotation at its upper end to a first driver (72) and at its lower end to a second driver (73). First driver (72) is fastened to coupling (68), while second driver (73) is fastened to coupling (69). Lower part (67) of drive shaft (63) is guided in rotation in a bearing (74) with the assistance of roller bearings (75), said bearing (74) being fastened to the upper part of housing (51).

At its upper end, lower part (67) of drive shaft (63) is connected in rotation to a hub (76) solid with cutting element (18) and a part of rotor (26). This hub (76) is fastened further to elastic coupling (69). At its lower end, lower part (67) of drive shaft (63) is connected in rotation to additional drive elements known by one skilled in the art and extending inside housing (51), such that cylindrical gears, for example, engage with one another for the driving of other cutting elements (19, 20).

In FIG. 4, it is seen that rotor (26) comprises two half-rotors (77, 78). Upper half-rotor (77) is fastened to flange (71), while lower half-rotor (78) is fastened to cutting element (18). At its upper part, lower half-rotor (78) is equipped with a cylindrical wall (79) which extends slightly inside the lower part of upper half-rotor (77) and which has an outside diameter slightly less than the inside diameter of the lower part of upper half-rotor (77). At its upper part, lower half-rotor (78) is equipped also with an annular part (80) which is connected to the lower part of cylindrical wall (79) and which has an outside diameter larger than the outside diameter of the rest of lower half-rotor (78) and upper half-rotor (77). Upper half-rotor (77) also comprises at its upper part an annular wall (81) having an outside diameter approximately equal to the outside diameter of annular wall (80).

As stated above, cutting element (18), rotor (26) which surmounts it and drive shaft (63) which extends in part inside rotor (26), turn around axis (64) directed upward. Intermediate shaft (56) and bevel gears (55, 61) turn around longitudinal axis (82) of arm (43). These two axes (64 and 82) intersect at point (83) which is the center of bevel gear pair (61, 62) extending in transmission housing (58).

In FIG. 4, it is seen also that axis (5) of joint (4) extends a distance (84) from rotation axis (64) of cutting element (18) in the direction of tractor (7) and a distance (85) lower than center (83) of bevel gear pair (61, 62) provided in transmission housing (58). In addition, it is seen that axis (5) extends approximately at middistance between cutting element (18) and center (83) of bevel gear pair (61, 62), and approximately at the same level as annular wall (81) of rotor (26).

Mower (1) which was just described operates as follows:

Its hitching device (8) is coupled to the hitching device of the tractor (7), and cardan transmission shaft (not shown) which is connected in rotation at one of its ends to pulley (14), is coupled to the power takeoff (not shown) of tractor (7).

At work, tractor (7) moves mower (1) in the direction of advance (6) and its power takeoff drives in rotation cutting elements (18, 19, 20) and rotor (26) surmounting cutting element (18) by transmission elements (13) and various drive elements which have been described. In turning, cutting elements (18, 19, 20) cut the product to be harvested which is in cutting zone (42). Since drive shaft (63) extends in large part inside rotor (26), any risk of hooking of cut product on drive shaft (63) is eliminated.

In addition, since foot (40) as well as a large part of leg (39) of support element (22) extend inside cutting zone (42), any risk of hooking of the cut product on support element (22) is eliminated as well, especially since rotor (26) moves the product cut by cutting element (18) in the direction of the median part of mowing group (2). On the side of outside cutting element (20), connecting element (25), because of its front edge (86) being inclined toward the rear and downward, separates the product cut by cutting element (20) from the product still standing.

Since support arm (9) can pivot a certain value in relation to hitching device (8) and mowing group (2) can pivot a certain value in relation to support arm (9), the mowing group (2) can adapt itself well to the configuration of the terrain to be mown. Lightening element (28) reduces the force with which mowing group (2) rests on the ground both at the level of cutting element (18) and of cutting element (20). This results, actually, from the fact that the hooking point—i.e. axis (34)—of lightening element (28) is located on mowing group (2) so as to create a recall torque directed counterclockwise when mower (1) is observed from the rear in direction of advance (6).

In transport (see FIG. 5), the hitching device of tractor (7) is initially operated to lift mower (1) from the moment when travel-limiting element (12) stops the pivoting of support arm (9) downward around pin (10). Then control element (27) is operated, which causes pivoting of mowing group (2) upward around joint (4). The transport position is reached when mowing group (2) occupies substantially a vertical position. As axis (5) of joint (4) extends at work a distance (85) lower than center (83) of bevel gear pair (61, 62) and is offset a distance (84) in relation to rotation axis (64) of cutting element (18) in the direction of tractor (7), it is seen that in the transport position, mowing group (2) extends only a relatively moderate distance (87) beyond the rear wheel of tractor (7) located on the same side as mowing group (2) even though mower (1) is a direct-driven mower. This exhibits numerous advantages as described above.

Obviously, numerous additional modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A mower to be moved by a tractor, during work in a direction of work, comprising:
    a frame for hitching said mower to the tractor during the work;
    a mowing group having a first end connected to said frame by a joint, said joint having an axis which is directed substantially in said work direction, said mowing group being positionable, during the work, in a work position in which it extends substantially close to the ground, said mowing group including:
    (a) at least one cutting element;
    (b) at least one rotor arranged close to the first end of said mowing group, said rotor extending at least partially above a part of said at least one cutting element and rotating around an upwardly directed rotational axis;
    (c) drive elements of said at least one cutting element and said rotor which receive the movement of a driving source, said drive elements comprising:
        (i) a drive shaft made up by at least one part, and extending into said rotor and having at least approximately the same rotational axis as said rotor;
        (ii) a first bevel gear pair arranged at an upper end of said drive shaft and being in meshing engagement, said first bevel gear pair defining a point where rotational axes of the bevel gears of said first bevel gear pair intersect;
    a control element for bringing the mowing gear from said work position to a transport position in which the mowing group is disposed in an upwardly directed direction, by pivoting said mowing group around said joint having an axis substantially directed in said direction of work, said axis of said joint connecting the mowing group to the frame being disposed in a vertically lower position than the point of intersection of the axes of the bevel gears of the first bevel gear pair.

2. The mower according to claim 1, wherein:
    the axis of said joint connecting the mowing group to the frame is disposed between the point of intersection of the axes of the bevel gears of said first bevel gear pair and said frame.

3. The mower according to claim 2, wherein: the axis of said joint connecting the mowing group to the frame extends beside said rotor.

4. The mower according to claim 1, wherein:
    the axis of said joint connecting the mowing group to the frame extends approximately at a middistance between said cutting element above which said rotor at least partially extends and said point of intersection of the axes of the bevel gears of said first bevel gear pair.

5. The mower according to claim 1, wherein:
    said rotor comprises an upper part, and
    the axis of said joint connecting the mowing group to the frame extends substantially at the same level as the upper part of said rotor.

6. The mower according to claim 1, wherein:
    (a) the mowing group comprises:
        (i) a support element which connects the mowing group to the frame; and
        (ii) a lower carrying element; and
    (b) said support element comprises:
        (i) bearing means defining said joint;
        (ii) a leg extending form the bearing means downward and comprising a foot where said leg is connected to said lower carrying element; and
        (iii) an arm extending from said bearing means upward and comprising an upper part where said arm is equipped with a transmission housing in which extends said first bevel gear pair.

7. The mower according to claim 6, wherein:
    said at least one cutting element defines a cutting zone, and
    the foot of said leg of the support element extends inside said cutting zone.

8. The mower according to claim 7, wherein:
    the foot of said leg of the support element extends, with respect to the direction of work, behind said at least one cutting element.

9. The mower according to claim 8, wherein:
    said foot of said leg of the support element extends, with respect to the direction of work, behind said at least one cutting element above which extends at least partially said rotor.

10. The mower according to claim 6, wherein, in top view, said bearing means of the support element is located ahead of the foot of said leg of the support element.

11. The mower according to claim 6, wherein:
    said bearing means of the support element is disposed between said rotor and said frame.

12. The mower according to claim 11, wherein:

the mowing group has a longitudinal vertical plane; and said bearing means of said support element extends substantially symmetrically in relation to said longitudinal vertical plane.

13. The mower according to claim 6, wherein:
said at least one cutting element defines a cutting zone; and
the bearing means of said support element extends, in top view, substantially outside of said cutting zone.

14. The mower according to claim 6, wherein:
said at least one cutting element defines a cutting zone; and
the leg of the support element extends, in top view, substantially inside said cutting zone.

15. The mower according to claim 6, wherein: the leg of the support element extends, in top view, partly above said at least one cutting element above which extends in part at least said rotor and is disposed beside said rotor.

16. The mower according to claim 6, wherein:
the leg of the support element extends from said bearing means of said support element downward and, with respect to the direction of work, in a rearward direction.

17. The mower according to claim 6, wherein:
the mowing group comprises a median part, and
the leg of the support element extends from the bearing means of said support element in part at least toward said median part of said mowing group.

18. The mower according to claim 6, wherein:
the mowing group comprises a median part, and
said arm of the support element extends from the bearing means of said support element towards said median part of the mowing group.

19. The mower according to claim 6, wherein the drive elements of said at least one cutting element and said rotor comprise:
a shaft guided in rotation in said bearing means of said support element and rotating around the axis of said joint;
a second bevel gear pair in meshing engagement and being connected in rotation to said shaft; and
an intermediate shaft connected in rotation to said second bevel gear pair and to said first bevel gear pair.

20. The mower according to claim 19, wherein:
said intermediate shaft extends inside the arm of said support element.

21. The mower according to claim 6, wherein:
said arm and said transmission housing are formed by a single part which is connected in a removable manner to said bearing means of the support element.

22. The mower according to claim 21, wherein:
the arm is centered in relation to said bearing means by means of a centering ring.

23. The mower according to claim 6 wherein the mowing group comprises:
a second end distant from said frame;
an upper carrying element connected to said support element; and
a connecting element extending close to the second end of said mowing group and connecting said upper carrying element to said lower carrying element.

24. The mower according to claim 6, wherein:
said control element is connected at one end to said frame and at the other end to said support element, the connection to said support element being made by a lever connected in an articulated manner to said control element and said support element, the pivoting of said lever in relation to said support element towards said frame being limited by a stop means.

25. The mower according to claim 6, wherein:
the mowing group comprises a cutting bar supporting said at least one cutting element; and
said cutting bar being carried by said support element and said lower carrying element.

26. The mower according to claim 6, wherein:
said lower carrying element of said mowing group comprises a stiffener means.

27. The mower according to claim 1, wherein:
said drive shaft is composed of several parts connected to each other by coupling means.

28. The mower according to claim 1 wherein:
the mowing group comprises several cutting elements each consisting of a disk, each disk rotating around its axis; and
the rotation axis of the one disk being arranged close to said first end of said mowing group and surmounted by the rotor, is merged with the rotation axis of said rotor.

29. The mower according to claim 1, wherein:
said rotor is formed by two half-rotors, said two half rotors being an upper half-rotor and a lower half-rotor; and
said upper half-rotor being connected to said drive shaft and said lower half-rotor being connected to said at least one cutting element above which extends in part at least said rotor.

* * * * *

UNITED STATES PATENT AND TRADEMARK OFFICE
CERTIFICATE OF CORRECTION

PATENT NO. : 4,896,493

DATED : 01/30/90

INVENTOR(S) : HORST NEUERBURG

It is certified that error appears in the above-identified patent and that said Letters Patent is hereby corrected as shown below:

In column 10, line 3, change "gear" to --group--;

In column 10, line 40, change "form" to --from--.

Signed and Sealed this

Second Day of July, 1991

Attest:

HARRY F. MANBECK, JR.

*Attesting Officer*                *Commissioner of Patents and Trademarks*